United States Patent
Hokstad

(10) Patent No.: US 10,175,373 B2
(45) Date of Patent: Jan. 8, 2019

(54) DETERMINING SUB-SURFACE TEMPERATURE

(71) Applicant: STATOIL PETROLEUM AS, Stavanger (NO)

(72) Inventor: Ketil Hokstad, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 497 days.

(21) Appl. No.: 14/786,108

(22) PCT Filed: Apr. 22, 2013

(86) PCT No.: PCT/EP2013/058330
§ 371 (c)(1),
(2) Date: Oct. 21, 2015

(87) PCT Pub. No.: WO2014/173436
PCT Pub. Date: Oct. 30, 2014

(65) Prior Publication Data
US 2016/0077228 A1    Mar. 17, 2016

(51) Int. Cl.
*G01V 1/30* (2006.01)

(52) U.S. Cl.
CPC ...... *G01V 1/306* (2013.01); *G01V 2210/6222* (2013.01)

(58) Field of Classification Search
CPC .................. G01V 1/306; G01V 2210/6222
USPC ..................................................... 702/12, 14
See application file for complete search history.

(56) References Cited

U.S. PATENT DOCUMENTS

| 3,975,674 A | 8/1976 | McEuen |
| 4,676,664 A * | 6/1987 | Anderson ............. E21B 47/065 |
| | | 374/136 |
| 8,729,903 B2 * | 5/2014 | Srnka ..................... G01V 11/00 |
| | | 324/334 |

FOREIGN PATENT DOCUMENTS

GB        2165674 A       4/1986

OTHER PUBLICATIONS

Yoneda et al. "Temperature flunctuation and thermodynamic properties in Earth's lower mantle: An application of the complete travel time equation of state", XP007922455, Earth and Planetary Science Letters, 126, (Jun. 14, 1994), 369-377.

* cited by examiner

*Primary Examiner* — Eman Alkafawi
(74) *Attorney, Agent, or Firm* — Birch, Stewart, Kolasch & Birch, LLP

(57) ABSTRACT

There is described a technique for determining a temperature at a region below the surface of the Earth. In an embodiment, a time of travel of a seismic wave following the emission from a source into the earth is provided, and the travel time is used to estimate the temperature. In one example, a model based on the travel time and a further component, which may for example be based on heat flow and a constant of proportionality between seismic velocity and thermal conductivity, may be used to estimate the temperature.

16 Claims, 3 Drawing Sheets

DETERMINING SUB-SURFACE TEMPERATURE

TECHNICAL FIELD

The present invention relates to determining the temperature in a region below the Earth's surface, in particular doing so based on seismic data.

BACKGROUND

An understanding of the temperature distribution within the Earth's crust is useful to identify regions of high thermal energy.

In the oil and gas exploration and production industry, the temperature regime in the Earth's crust may determine the reservoir quality and type of hydrocarbons present in a subsurface reservoir and in turn affect the ability to recover hydrocarbons from such a reservoir.

Empirical data presented by Steen and Nadeau (see Steen, Ø., and Nadeau, P. K., 2007, *AAPG annual meeting, Long Beach, AAPG Search and Discover Article*, #90063) shows that 90% of the world's oil and gas fields are found at a present-day temperature less than 120 centigrades. Hence, it is of great interest to identify this zone. It may similarly be desirable to identify parts of a basin that are likely to be unproductive, have immature source rock, or be gas-prone. The inclusion of temperature in an evaluation of a geological basin is critical for finding sweet spots for oil and gas generation in the basin.

Seismic data may be acquired for imaging the subsurface structure. For example, a seismic survey of a region may be performed in which a seismic wave is transmitted from the surface into the subsurface. Receivers may be then used to measure the amplitude of seismic waves from the subsurface in response to the transmission and the arrival times of the seismic waves relative to the transmission. High amplitude events may be associated with acoustic reflectors in the subsurface rock structure. The data from different lateral locations may be presented in the form of aligned time series traces to form a 2D seismic image of the subsurface showing the time location of different reflectors, time in effect being a proxy for depth. Such an image may reveal the structure of the subsurface. Typically, the amplitudes are plotted against the full two-way travel time (TWT), being the time of a transmitted seismic wave to travel from a seismic source to a subsurface reflector and from the reflector to a seismic receiver. The travel time is dependent upon the seismic velocity of the subsurface rock structure, and may be converted to a true depth amplitude section, for example by employing a "vertical stretch" technique.

The seismic data may be visualised in real time, during acquisition of the data. The acquisition may be performed offshore using a survey vessel. Preliminary processing of the data may be performed. The data may then be transmitted via a communications link to a data room equipped with displays to visualise the data, for example in the form of a 2D seismic image.

Temperature information is often added to seismic images of the seafloor to visualise the temperature distribution. For example, contour maps of TWT projected onto the surface of the seabed may have temperatures overlain, or isotherms may be plotted onto 2D TWT seismic sections.

Current techniques for determining the temperature distribution typically involves using basin modelling software packages, which require geological models in true vertical depth, populated using geophysical properties such as heat conductivity, density, and heat capacity, or use libraries of subsurface lithologies and associated compaction trends. These techniques may compute temperature profiles using a steady state approximation, by solving the equations of Fourier's Law, or solving the full time-dependent heat equation.

Such techniques may not be convenient to use because of the input demands of the software. This may particularly be so in data rooms, where data are accessible or visible to the user for a limited period of time, for example, a couple of hours, or at most two days. In addition, specialist software of this kind may not be available in a data rooms. Furthermore, use of such software may require expert users to operate it.

SUMMARY OF THE INVENTION

In a first aspect of the invention, there is provided a method of determining a temperature of a region below the surface of the Earth, the method comprising:
  (a) providing at least one seismic travel time, being associated with a response to at least one source emission into said region in a seismic survey; and
  (b) using said travel time to determine said temperature at the or each travel time.

The at least one seismic travel time may thus be relative to at least one emission of a seismic wave from a source into said region.

The method may further comprise providing at least one component for combining with said travel time, and step b may comprise combining said component with said travel time to calculate the temperature.

The component for combining with the temperature or travel time may be predetermined component. Thus, the component may not need to be re-evaluated for each determination.

The component may be based on heat flow at the Earth's surface, at the sea floor in the marine case. The component may be based on seismic velocity, thermal conductivity, or model relationship between seismic velocity and thermal conductivity. The model relationship may comprise a linear relationship between seismic velocity and thermal conductivity. The component is based on a parameter defining, at least in part, said model relationship.

In particular, the component can be or be equal or approximately equal to a ratio between first parameter and second parameters, the first parameter being the heat flow at the Earth's surface. The second parameter can be or be equal or approximately equal to a ratio between seismic velocity and thermal conductivity.

By way of using the ratio of seismic velocity and thermal conductivity the dependence upon depth in the determination of temperature using combining component is removed.

Either or both of the component and the second parameter may be constant for at least one or more than one of: (i) a plurality of travel times: (ii) at least one lateral location; and (iii) a plurality of lateral locations.

The second parameter may be a constant of proportionality between seismic velocity and thermal conductivity. The second parameter may typically take a value in the range of 0 to $1 \times 10^{-3}$ Ws/Km$^2$, and more typically in the range of 0.3 to $0.7 \times 10^{-3}$ Ws/Km$^2$.

The method may further comprise determining either or both of the heat flow and the second parameter. The method may further comprise obtaining at least one seismic velocity and at least one thermal conductivity for said region, and using the obtained velocity and/or thermal conductivity to calculate the ratio there between.

The seismic response may comprise at least one time series of amplitudes associated with at least one lateral location. The response may be recorded during a recording period, and the step of providing said travel time comprises selecting a time from said recording period. The response may further comprise using the determined temperature to determine a location for drilling a borehole, and may further comprise analysing the seismic response together with said temperature to determine said location.

The method may further comprise using the determined temperature to determine a location to drill a borehole for extracting hydrocarbons from the subsurface.

The method may further comprise using the determined temperature to determine a property of the subsurface. The property may comprise any one or more of: maturity, type or distribution of fluid contained in the subsurface. The method may further comprise using said property to determine a location to drill a borehole for extracting hydrocarbons from the subsurface.

The step b in the first aspect may include identifying at least one location in a table using said travel time and looking up a temperature value for said location. The table may then comprise pre-determined temperature values calculated from combining a component with model travel times.

Step b in the second aspect may include identifying a location in a table using the provided temperature of interest, and may include looking up the travel time for said location. The table in this case may then comprise pre-determined travel values calculated from combining a component with model temperatures.

In a third aspect of the invention, there is provided apparatus for performing a method of either of the first and second aspects.

In a fourth aspect of the invention, there is provided a computer program for use in performing the method of either of the first and second aspects, the program comprising instructions for estimating the temperature based on said travel time.

In a fifth aspect of the invention, there is provided a computer device arranged to execute the program of the fourth aspect to estimate said temperature based on said travel time.

In a sixth aspect of the invention, there is provided a computer readable storage medium containing the program of the fifth aspect.

In another aspect, there may be provided a method of determining a seismic travel time at which a region below the Earth's surface has a temperature of interest, said time being associated with a response to an emission of a seismic wave from a source into said region, the method comprising: providing the temperature of interest; and determining said travel time using the provided temperature of interest. The method may further comprise providing at least one component for combining with the provided temperature of interest, and may comprise combining said component with said temperature to calculate the travel time.

Each of the above aspects may include further features as set out in the claims or in the present description or the drawings in any combination. Features may be combined between any of the different aspects.

Each feature disclosed or illustrated in the present specification may be incorporated in the invention, whether alone or in any appropriate combination with any other feature disclosed or illustrated herein.

The invention provides a way to calculate temperature that is convenient if for example depth converted data are not available. Step b can be performed without requiring to convert said travel time to depth, and this can simplify the determination of temperature compared with prior art techniques.

DESCRIPTION AND DRAWINGS

There will now be described, by way of example only, embodiments of the invention with reference to the accompanying drawings, in which.

Figure 1:
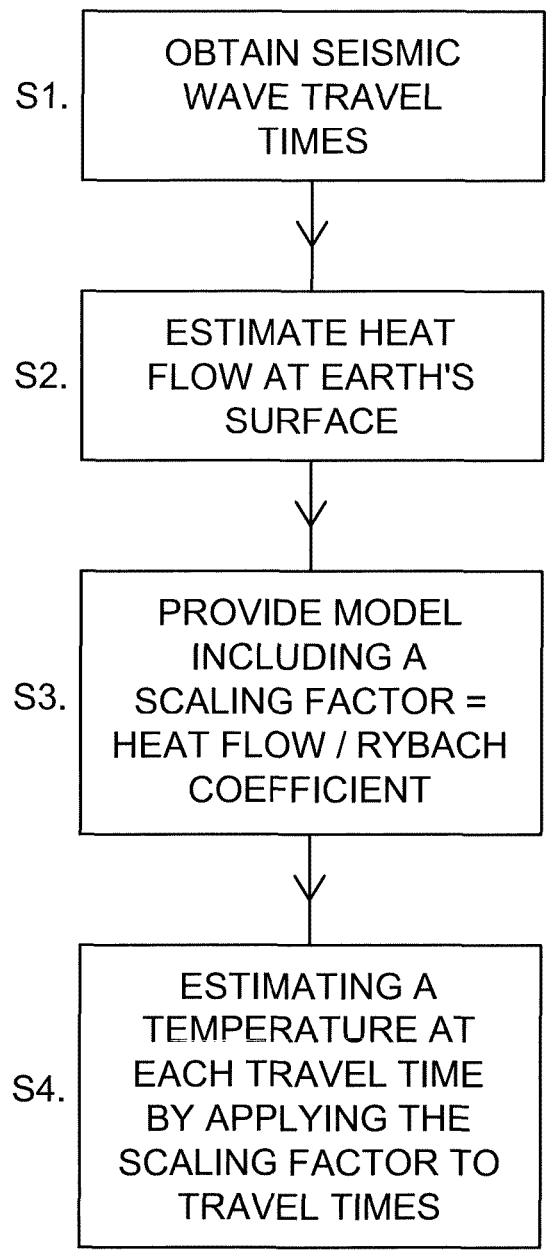
FIG. 1 is a flow diagram showing steps of a method according to an embodiment of the invention.

A "rule-of-thumb" estimate of present day sub-surface temperature may be performed as a function of seismic two-way-time. The assumptions are that:

1. heat flow is constant (steady state approximation);
2. there is a linear relationship between thermal conductivity and vertical seismic P-wave velocity, with a known constant of proportionality; and
3. an estimate of the heat flow at the seabed is available (typically from publications)

An additional assumption is that a vertical stretch type depth conversion is reasonable within acceptable bounds.

A geological model or relationship for estimating the temperature can be derived as follows:

Assume that Fourier's Law for 1D heat flow applies and that steady state has been reached. The temperature gradient with depth can then be given as:

$$\frac{dT}{dz} = \frac{q}{k} \quad (1)$$

where T is temperature, z is depth, k is thermal conductivity, and q is the steady-state heat flow. The solution to (1) is then given by:

$$T(z) = q \int_{z_{SF}}^{z} \frac{dz'}{k(z')} \quad (2)$$

where subscript $z_{SF}$ signifies the sea floor, and is the depth below the sea floor.

We assume a linear relation between the thermal conductivity and velocity $v_0$, given as follows:

$$k(z) = a v_0(z) \quad (3)$$

The coefficient a is a constant of proportionality between the conductivity and velocity and has been determined empirically (see Rybach, L., Leu, W., and Greber, E., 1997, *Sediment thermal conductivity derived from wireline logs—calibration by cores and cuttings*, 59th EAGE Conference and Technical Exhibition, Geneva, Expanded Abstract, F028), as follows:

$$a = 0.54 \cdot 10^{-3} \frac{Ws}{Km^2}$$

(i.e. the unit of $v_0$ is m/s)

Substituting equation (3) for $k(z)$, the integral (2) can be written as:

$$T(z) = \frac{q'}{a} \int_{z_{SF}}^{z} \frac{dz'}{v_0(z')} \qquad (4)$$

The integration variable in (4) can be changed from depth to vertical seismic two-way-time $t_0$, as follows:

$$dz' = \frac{v_0}{2}(t'_0)dt'_0 \qquad (5)$$

Inserting the changed variable into (4), the temperature integral becomes independent of velocity and trivial, as indicated in the following:

$$T(t_0) - \frac{q}{2a}\int_{t_{SF}}^{t_0} \frac{v_0(t'_0)}{v_0(t'_0)} dt'_0 = \frac{q}{2a}\int_{t_{SF}}^{t_0} dt'_0 \qquad (6)$$

Rewriting the integral of (6), the temperature at time $t_0$ is:

$$T(t_0) = \frac{q}{2a}[t_0 - t_{SF}] \qquad (7)$$

where $t_0$ is two-way-travel time and $t_{SF}$ is two-way-travel time to the sea floor.

The equation (7) provides a model or relationship for estimating the present day steady-state temperature as a function of two-way-travel time below the sea floor, heat flow at the surface, and Rybach's constant.

Using the model of equation (7), the temperature can be calculated for a given travel time, or vice versa, for a given temperature the corresponding travel time can be calculated. The latter may be useful for plotting a certain isotherm on a seismic image of data in the travel time domain.

The apostrophe associated with the different parameters of the equations above is used to indicate the integration variables.

With reference to FIG. 1, noting the derivation described above, the temperature at a subsurface location may be estimated via the following steps:

S1: Data are obtained. The data may comprise measurements of travel times of seismic waves propagating in the subsurface between a seismic source and a receiver. This may be for example the two-way time (TWT) of travel of a wave from the source, e.g. at the seafloor to a subsurface reflector and from the reflector to the receiver, e.g. at the seafloor. TWT should be understood to mean two-way vertical seismic travel time of primary (single-reflection) events.

S2: A heat flow at the surface is estimated. This may be obtained from global or regional heat flow data, which may be readily available. A typical heat flow may have a value of around 40 to 60 mW/m². A specific value used experimentally is q=48 mW/m².

S3 & S4: A model is provided which has a scaling factor ("component") of q/a, as for example given by equation (7), for combining with and scaling the travel times. By applying the scaling factor to the travel times, the temperature is estimated for each travel time. It will be appreciated that in, both of a and q may take different values, depending on circumstances. A value of q/a of between 0 and $1\times10^{-3}$ Ws/Km² may typically be considered. The ratio q/a can be determined if well data are available. Otherwise it will be taken from analogue models/areas.

Figure 2:
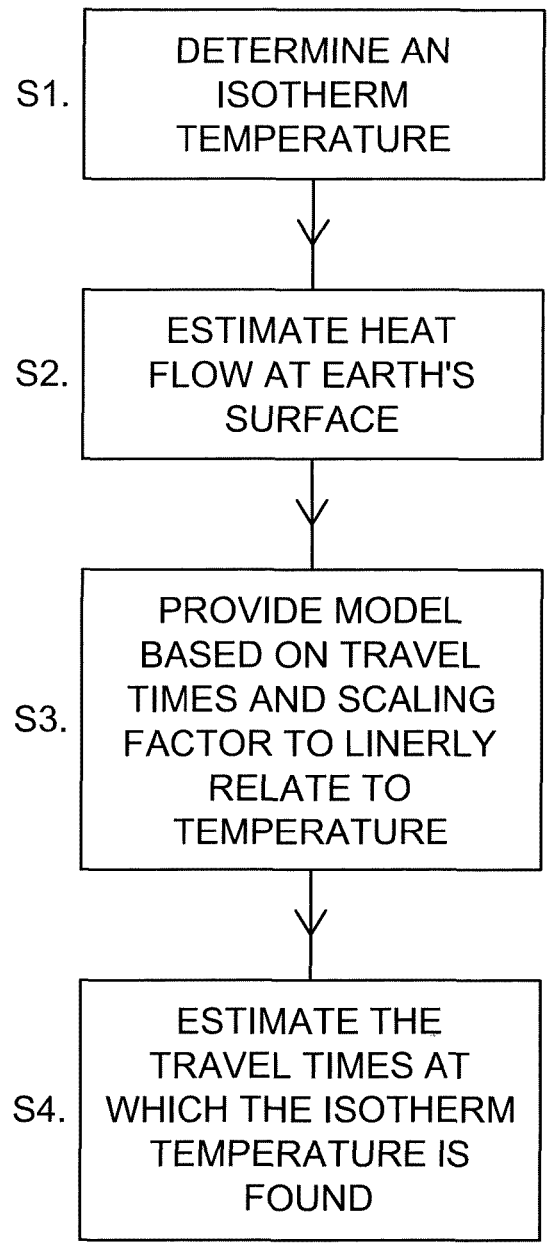
FIG. 2 is a flow diagram showing steps of a method according to another embodiment of the invention.

With reference to FIG. 2, a further example comprising the following steps S1 to S4:

S1: An isotherm temperature is determined. This may be a desired isotherm for adding to a seismic amplitude data set at different two-way travel times at different lateral locations.

S2: A value for the heat flow at the Earth's surface is estimated, e.g. from a heat flow map.

S3: A model is provided. The model may comprise model travel times, the model travel times being linearly related to a model temperature by a scaling factor ("component"), c.f. equation (7).

S4: The travel times for the isotherm temperature are estimated, using the model.

Equation (7) indicates that in the case of a horizontal seafloor, isotherms are lines of constant two-way-time on a stacked seismic time section. Laterally varying heat flow and variable bathymetry are straightforward to deal with. Different heat flow values can simply be selected and applied with Equation (7) for different lateral locations. In some variants of the method, if necessary, the depth corresponding to each travel time can be estimated using a vertical stretch depth conversion given suitable seismic velocities for the subsurface media. The isotherms or temperatures can then be plotted as a function of depth, without additional loss of accuracy. Whilst the isotherms will be straight lines in the time domain, when converted to depth, the isotherms may vary laterally with depth as controlled by the velocity model.

The model of equation (7) is simple to use. When travel time data are provided, the temperature can be calculated by simply multiplying the travel times by the component q/2a. Conversely, when temperature data are provided, the travel time can be calculated by simply multiplying the temperatures by the component 2a/q. The multiplying components which define the linear relationship between temperature and travel time take typically a constant value for each lateral location and at multiple lateral locations, and may be pre-calculated.

There may in general be a different constant of proportionality, e.g. heat conductivity to velocity ratio, along a seismic trace. Thus, for different intervals of two-way time the ratio may have a different value. According to rock physics investigations the constant of proportionality can be determined by the clay fraction. Typically this is logged in boreholes. However, in a frontier setting, without wells, the clay fraction can often be estimated by sedimentological interpretation and insight, based on understanding of the depositional system. In many cases, an average clay fraction of say 50%, will be adequate.

Figure 3:
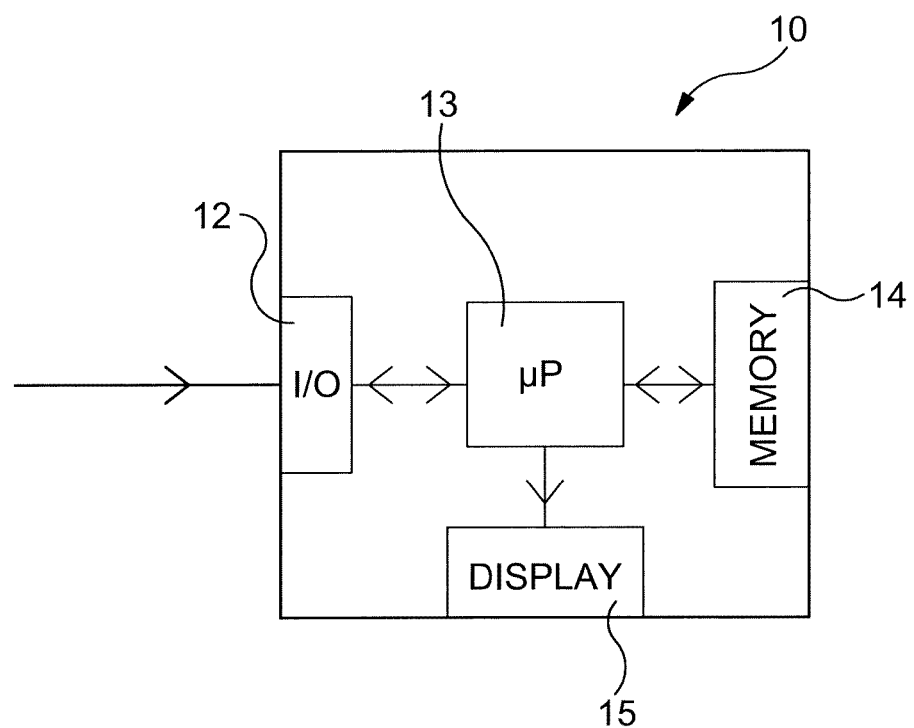
FIG. 3 is a representation of apparatus according to another embodiment of the invention, and which may be used for performing the methods of FIG. 1 or FIG. 2.

With reference to FIG. 3, there is shown an example of a computer device 10 for use in estimating a temperature at a subsurface location. The computer device 10 has an In/Out device 12 used for receiving the travel times. The computer device 10 has a micro processor 13 used for processing the travel times. In addition, the computer device 10 may be provided with a computer program, stored in a memory device 14, which comprises computer readable instructions for performing the calculation of temperature using the travel times. The memory device 14 may also store the heat flow constant and the proportionality constant which make up the scaling factor. The micro processor is connected to the In/Out device 12 and memory device 14, and is used for executing the program to calculate the temperature according to equation (7). The computer device may include a display 15 which may be used for visualising the estimated temperatures, for example against time or depth. Seismic amplitude data may be displayed against depth or time, for example as an image in the form of a 2D seismic depth or time section covering a plurality of lateral locations, and the estimated temperatures with time or depth may be overlain, for example in the form of isotherm lines.

The computer device may be provided in a compact unit or may be a distributed system in which for example each of the individual components 12-14 are provided separately of each other. Any or each such component may be provided in separate location and may communicate with one another over a data communication network, for example by cable or wirelessly. The display may be provided in a data room location. The memory device 14 may comprise a portable storage medium which may contain the computer program or parts thereof. The medium may be an optical disk or memory stick or the like, which can be selectively connected or disconnected to the device 10 (for example through a wireless network) as required.

The technique described provides a number of advantages. Seismic travel times are linked into temperature computations. This allows computation of temperature distributions in seismic two-way time, without any need for additional geological or geophysical information in vertical depth. There is no need to convert travel times to depth before obtaining the temperature from the travel times. Indeed, there is no need to convert travel times to depth at all in order to obtain a temperature. In order to achieve this, the correlation between heat conductivity and seismic velocity is utilised as described in Equations (3) to (7). Earlier methods involve only depth and temperature.

The relationship of Equation 7 provides a simple and convenient way to estimate temperature. Time can be saved and an estimate of likely present day temperature isotherms can be provided in a limited time window in for example a data room or other situation where a fast evaluation of a basin may be useful. Preparations to calculate q/a can be made such that the user can provide the isotherms as, for example, maps of two-way-time (TWT) to be added to the seabed, to give rapid identification of the so-called "golden zone" of source rock maturity for oil exploration. The preparation is straightforward. Detailed input information is not required.

Seismic travel time data plus only two further additional inputs are required, i.e. the estimate of the steady-state heat flow at the seabed, and the constant of Rybach's linear relation between seismic velocity and thermal conductivity. The heat flow and the constant relating velocity and thermal conductivity can typically be estimated in advance (before use in a data room or other fast-assessment situation where data are typically available only in TWT), such that the scaling factor can be readily applied to the travel times and isotherms/temperatures estimated.

It can also be noted that the travel time in seismic sections is robust to velocity error, as it is only very weakly sensitive to seismic stacking velocity. This contributes to provide robustness to the temperature estimation. Only if the isotherms are converted to depth (if desired) are accurate seismic velocities required.

Further, the method of determining the temperature is easy to adapt for lateral variations in heat flow. It gives present day and steady-state temperature. This can then potentially be used as a final boundary condition for estimates of the temperature history of a basin. If necessary, travel times together with associate temperatures results can be converted to depth via the use of appropriate seismic velocities.

Various modifications and improvements may be made without departing from the scope of the invention herein described.

The invention claimed is:

1. A method of determining a temperature T of a region below the surface of the Earth, the method comprising:
    (a) providing at least one vertical seismic two-way travel time t, being associated with a response to at least one source emission into said region in a seismic survey; and
    (b) applying a scaling factor q/2a to each of the at least one vertical seismic two-way travel time t to determine said temperature T at the or each travel time, where q is a steady state heat flow at the earth's surface, and a is an empirically determined constant equivalent or approximately equivalent to a ratio between a seismic velocity v and a thermal conductivity k;
    (c) using said determined temperature T to determine a property of the subsurface, the property comprising any one or more of: maturity, type and distribution of fluid contained in the subsurface;
    (d) using said property to determine a location to drill a borehole for extracting hydrocarbons from the subsurface.

2. The method as claimed in claim 1, wherein at least one of said scaling factor and said empirically determined constant a is constant for any one or more of:
    (i) a plurality of travel times;
    (ii) at least one lateral location; and
    (iii) a plurality of lateral locations.

3. The method as claimed in claim 2, wherein said empirically determined constant a takes a value in the range of 0.3 to $0.7 \times 10^{-3}$ Ws/Km$^2$.

4. The method as claimed in claim 2, further comprising determining at least one of the steady state heat flow q and the empirically determined constant a.

5. The method as claimed in claim 1, wherein said empirically determined constant a takes a value in the range of 0.3 to $0.7 \times 10^{-3}$ Ws/Km$^2$.

6. The method as claimed in claim 1, further comprising determining at least one of the steady state heat flow q and the empirically determined constant a.

7. The method as claimed in claim 1, further comprising obtaining at least one seismic velocity v and at least one thermal conductivity k for said region, and using the obtained velocity and/or thermal conductivity to calculate the ratio there between.

8. The method as claimed in claim 1, wherein the seismic response comprises at least one time series of amplitudes associated with at least one lateral location.

9. The method as claimed in claim 8, wherein the response is recorded during a recording period, and the step of providing said travel time t comprises selecting a time from said recording period.

10. The method as claimed in claim 1, further comprising using the determined temperature to determine a location for drilling a borehole.

11. The method as claimed in claim 10, which further comprises analysing the seismic response together with said temperature T to determine said location.

12. A computer program embodied on a non-transitory computer readable medium for use in performing the method of claim 1, the program comprising instructions for estimating the temperature based on said travel time.

13. The method as claimed in claim 1, wherein at least one of said scaling factor and said empirically determined constant a is constant for any one or more of:
    (i) a plurality of travel times;
    (ii) at least one lateral location; and
    (iii) a plurality of lateral locations.

14. The method as claimed in claim 1, wherein said empirically determined constant a takes a value in the range of 0.3 to $0.7 \times 10^{-3}$ Ws/Km².

15. The method as claimed in claim 1, further comprising determining at least one of the steady state heat flow q and the empirically determined constant a.

16. A computer-implemented method comprising:
    measuring at least one vertical seismic two-way travel time of seismic waves propagating in a subsurface between a seismic source and a receive, the two-way travel time being a travel time of a wave from a source at a seafloor to a subsurface reflector in a region below the surface of the Earth, and from the subsurface reflector to the receiver at the seafloor, the two-way travel time being associated with a response to at least one source emission into the region below the surface of the Earth in a seismic survey;
    estimating a heat flow at the surface from global or regional heat flow data;
    establishing a model having a scaling factor q/2a, where q is a steady state heat flow at the earth's surface and a is an empirically determined constant equivalent or approximately equivalent to a ratio between a seismic velocity v and a thermal conductivity k;
    applying the scaling factor q/2a to each of the at least one vertical seismic two-way travel time t;
    determining a temperature T of the region below the surface of the Earth using the model;
    determining a property of the subsurface based on the determined temperature T, the property comprising any one or more of: maturity, type and distribution of fluid contained in the subsurface;
    and determining a location for drilling a borehole for extracting hydrocarbons from the subsurface based on the determined property.

* * * * *